(12) United States Patent  
Libby, II et al.

(10) Patent No.: US 7,888,597 B2  
(45) Date of Patent: Feb. 15, 2011

(54) FIXTURE BOX ENCLOSURE

(75) Inventors: Charles A. Libby, II, Montoursville, PA (US); Robert A. Libby, Williamsport, PA (US); Kyle Mason, Williamsport, PA (US); David E. Montgomery, Montoursville, PA (US)

(73) Assignee: Aslan Industries Corporation, Montoursville, PA (US)

( * ) Notice: Subject to any disclaimer, the term of this patent is extended or adjusted under 35 U.S.C. 154(b) by 306 days.

(21) Appl. No.: 12/287,013

(22) Filed: Oct. 2, 2008

(65) Prior Publication Data

US 2010/0084186 A1  Apr. 8, 2010

(51) Int. Cl.  
*H01H 9/02* (2006.01)

(52) U.S. Cl. .............................. 174/58; 174/61; 174/54; 174/63; 439/535; 248/906

(58) Field of Classification Search ................... 174/58, 174/61, 54, 63; 220/3.2, 3.3, 3.9; 362/147, 362/150, 366; 248/343, 909, 906; 52/39; 439/535

See application file for complete search history.

(56) References Cited

U.S. PATENT DOCUMENTS

| 3,302,918 | A | * | 2/1967 | Cohen | 248/343 |
| 5,044,582 | A | * | 9/1991 | Walters | 248/57 |
| 5,150,868 | A | * | 9/1992 | Kaden | 248/343 |
| 5,975,938 | A | | 11/1999 | Libby | |
| 7,144,269 | B2 | | 12/2006 | Libby et al. | |
| 7,281,941 | B1 | | 10/2007 | Libby, II et al. | |
| 7,531,744 | B1 | * | 5/2009 | Rohmer | 174/58 |

\* cited by examiner

*Primary Examiner*—Dhiru R Patel  
(74) *Attorney, Agent, or Firm*—Thomas R. Shaffer (57) ABSTRACT

A fixture box for a light fixture or the like is disclosed. An input port accessible from the exterior of the housing is provided to receive and terminate an incoming electrical power source cable. An output port accessible from the exterior of the housing is also provided to provide electrical power to another fixture. A light fixture port accessible from the interior of the housing provides an electrical connection between the incoming power and the light fixture. Enclosed hot, neutral and ground buss portions are provided to make electrical connections and provide electrical power between the input port to the output port and to the fixture port. The fixture box also lowers labor costs due to the quick termination of the Q-CEB to the snap in connection at the ports.

11 Claims, 9 Drawing Sheets

FIXTURE BOX ENCLOSURE

FIELD OF THE INVENTION

The present invention relates to a fixture box that will support a light fixture or luminaire. More specifically it relates to it manufactured enclosure which will support a light fixture having connector ports to make reliable electrical connections from the light fixture to the unstripped end of a multi-conductor cable. The wire connections and bussing for the fixture will be completely enclosed.

DESCRIPTION OF THE PRIOR ART

The purpose of a fixture box is to provide a means of hanging or mounting a light fixture to a ceiling or wall, to make electrical connections to the light to power the fixture, and to enclose the wire connections made between the incoming multi conductor cable and the wires going to the light fixture. The incoming wire or feed is typically a two conductor with ground, non-metallic cable otherwise know as NM-B or Romex®. The incoming wire may also have more than two conductors with a ground. For example, a three conductor wire with a ground would be required to install three way switches and the like. This cable has a minimum of three conductors, a ground wire which is a bare conductor, and two insulated conductors, a hot and a neutral wire. These wires are enclosed by an outer jacket or sheath.

Prior to the present invention, the fixture box whether plastic or metal was anchored to a stud or joist by screws or nails before installing any finished wall material. Electrical wire connections were then made to the light fixture with the NM-B cable after the cable was brought into the metal or plastic box and fed from a switch to control the light fixture. If a metal box was used, the installer had to supply a cable connector to support the cable and to anchor it to the box. If a plastic box was used, the cable would have to be run through a plastic mechanical clamp. The outer sheath or jacket of the cable then had to be removed. The individual conductors had to be separated and the insulation stripped off of the hot and neutral conductors coming from the power feed. The insulation on the wires coming from the light fixture also had to be removed and then the wires had to be connected with twist-on wire connectors. This was a labor intensive method and if more than one fixture was being powered or controlled another cable would have to be installed in that fixture box and the proper connections made by the same method.

The present invention is specifically designed for use with the Q-CEB connector which is illustrated in Libby, U.S. Pat. No. 5,975,938 (FIGS. 2, 3, & 4) and in Libby, U.S. Pat. No. 7,281,941. The design of this invention will eliminate the labor involved when installing light fixtures, provide safe connection points, and allow the installer to change out fixtures easily and rapidly according to the application.

SUMMARY OF THE INVENTION

As used in this application the term "fixture" is broadly defined and includes light fixtures, ceiling fan fixtures, bathroom fan fixtures and any other similar electrical devices which are mounted in a ceiling, wall or floor of a structure. For the sake of simplicity, the application will specifically describe the invention as used for the installation of a light fixture. The present invention provides a fixture box having a unique design that will accept any style or shaped light fixture or the like and allows the fixture box to be mounted before or after the finished wall is installed. A means of connecting NM-B cable to a light fixture is accomplished by providing connection points described below. In its simplest form, the present invention provides a fixture box for a light fixture or the like comprising:

(a) a housing having an interior and an exterior;
(b) an input port accessible from the exterior of said housing to terminate the incoming electrical power cable;
(c) an output port accessible from the exterior of said housing to provide a means providing electrical power to another fixture;
(d) a light fixture port accessible from the interior of said housing providing an electrical connection between the incoming power and the light fixture;
(e) an enclosed hot metal bussing portion to connect a hot side of an electrical power source applied to the input port to the output port and to the fixture port;
(f) an enclosed neutral metal bussing portion to connect a neutral side of an electrical power source applied to the input port to the output port and to the fixture port;
(g) an enclosed ground metal bussing portion to connect a ground of an electrical power source applied to the input port to the output port and to the fixture port;

Preferably, said housing has a base member having an interior surface and an exterior surface, said exterior surface forming a bottom side of the fixture box with said input port being located in a first position on said bottom side of said fixture box whereby said input port will accept a Q-CEB connector and said input port is a termination point of the NM-B cable which carries electric current from an electrical power source to the light fixture through said bussing.

Preferably, said output port is located in a second position on the bottom side of the fixture box and will accept a Q-CEB connector to provide a connection to an auxiliary cable running to an added light fixture, said output port being connected to said input port by said hot, neutral and ground bussing portions.

Preferably, said light fixture port is located on an interior surface of said base member located inside the fixture box and is designed to accept a molded plug installed on a light fixture to provide a plug type connection whereby eliminating the manual stripping of insulated wires and the use of twist-on wire connectors to make electrical connections, said light fixture port being provided with electrical power from said input port by said hot, neutral, and ground busing.

Preferably, the fixture box further includes mounting blocks with mounting holes at an angle "A" located inside the box providing options of mounting the box before or after finished wall is installed. Said fixture box can then be used in new or old construction work. Mounting holes contain a compression node to protect the countersink holes.

Preferably, said mounting blocks are separated by a partition wall to keep a wire compartment separate and insulated from mounting screws.

Preferably, a bottom side of fixture box is designed with two optional mounting holes for attaching a ceiling bracket clamp so the fixture box can be mounted between two joists with a ceiling bar bracket.

DETAILED DESCRIPTION OF THE PREFERRED EMBODIMENTS

Figure 6A:
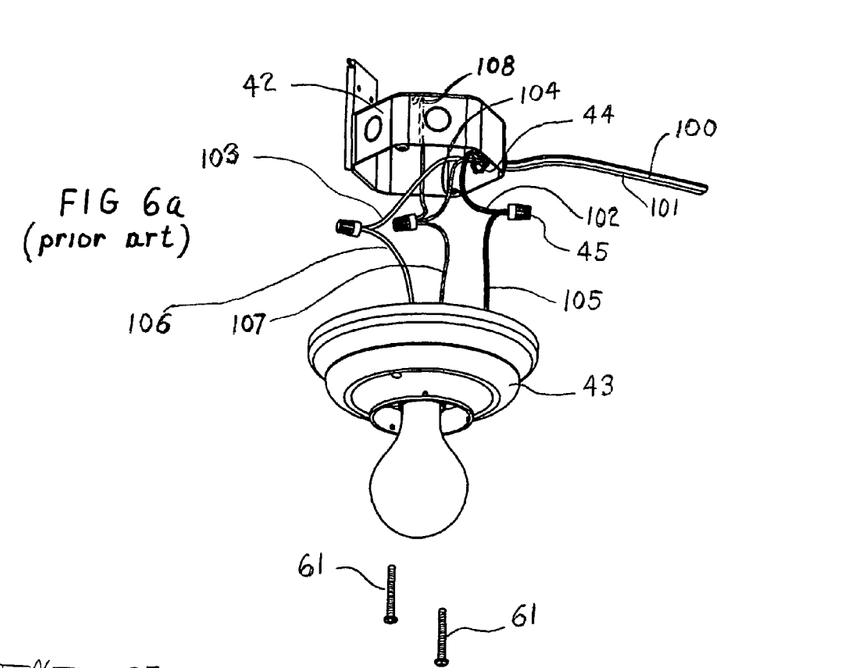
FIGS. 6a and 6b are perspective views of prior art fixture wiring in a fixture box and detailing the installation in the ceiling.
Figure 6B:
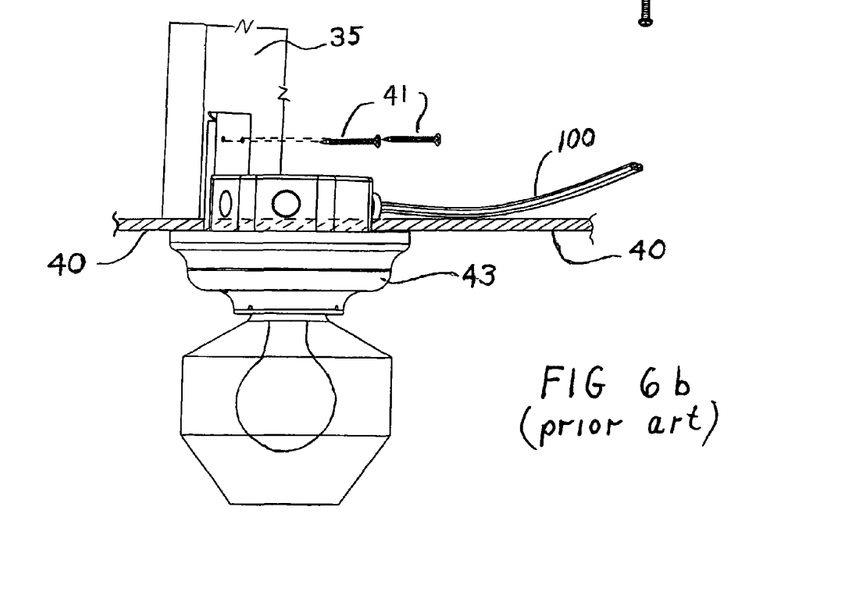

Referring first to FIG. 6a, prior art shows the NM-B cable 100, which supplies the electrical current from an electrical power source panel to a switch, then to the light fixture box 42, and light fixture 43. The cable 100 has an outer sheath or jacket 101, and consists of at least three individual conductors, namely, a hot conductor 102, a neutral conductor 103, and a ground wire 104. The cable 100 is anchored by using a cable connector 44 and the terminations of the individual conductors are made with twist-on wire connectors 45 that connect the wires 105, 106, and 107 from the light fixture 43 to the NM-B cable in the fixture box. The prior art devices contemplate that the installer will run the cable into a previously mounted fixture box. The fixture box is anchored to a ceiling joist or stud 35 by nails or screws 41. FIG. 6b represents a typical prior art ceiling installation. The drywall or finished ceiling 40 is installed after the fixture box is mounted and wired and then the fixture is wired to the box after the ceiling is completed.

Figure 1A:
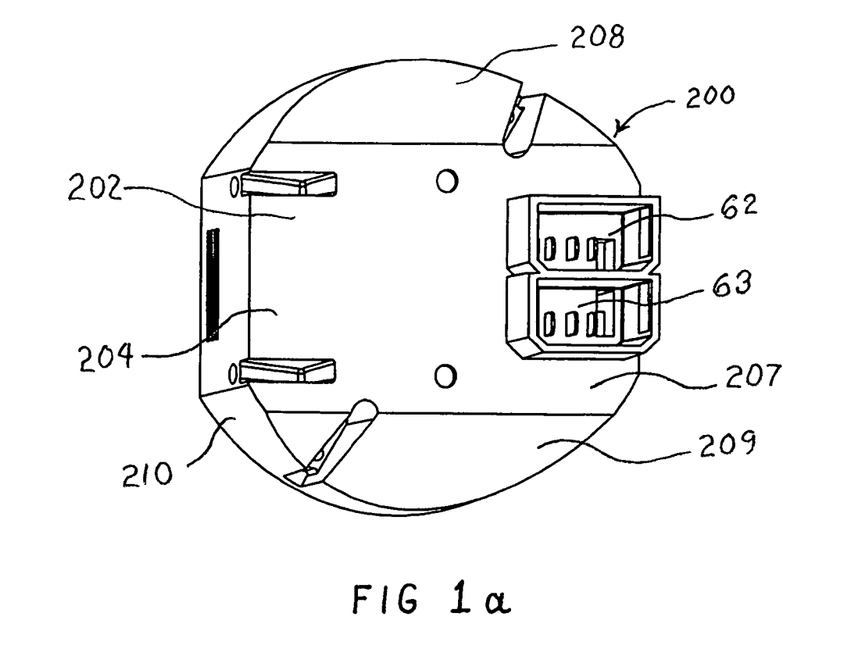
FIGS. 1a, 1b, 1c, and 1d, respectively, are bottom perspective, back perspective, side perspective and open top perspective views of a fixture box of the present invention.
Figure 1B:
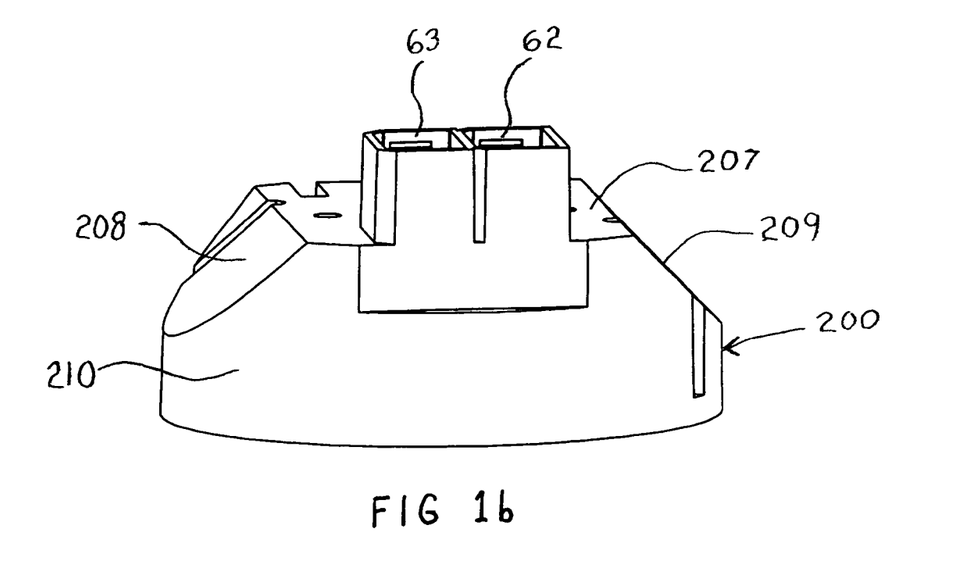
Figure 1C:
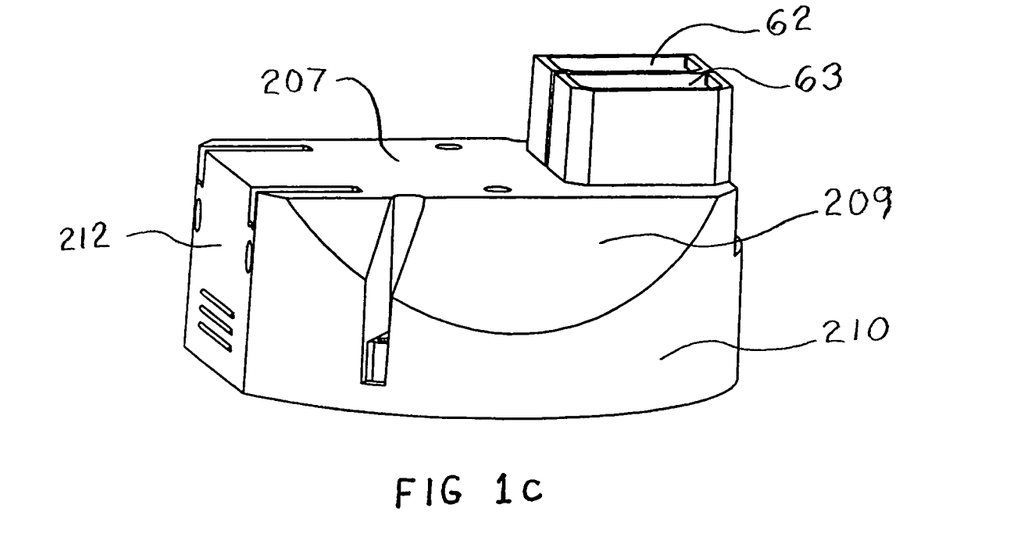
Figure 1D:
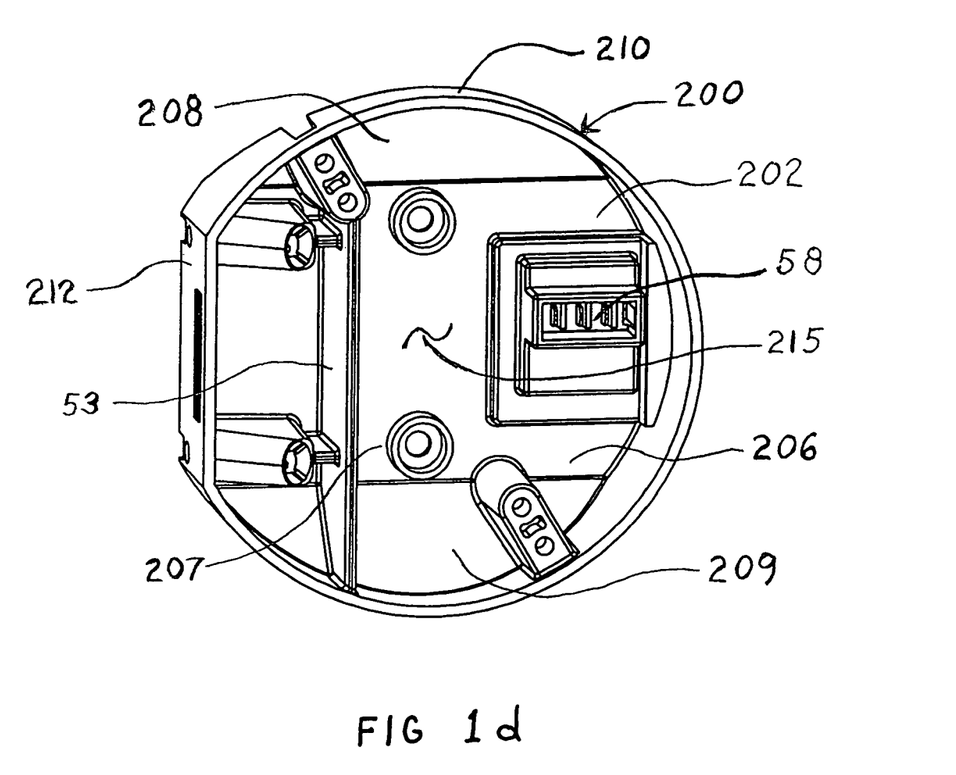

FIGS. 1a, 1b, 1c and 1d show the basic design of the housing 200 which has a bottom wall 202 which has in exterior bottom surface 204 and an interior bottom surface 206. A central portion 207 of the bottom wall is generally flat with two sloping bottom portions 208 and 209 which slope upwardly from the central portion at an approximate 45° angle on opposite sides of the central portion 207. A generally cylindrical side wall 210 which has a flat end portion 212 extends upwardly from the bottom wall 202. The fixture box 200 has an interior 215 which is shown in FIG. 1d. The location of ports 62, 63 and 58 is shown.

Figure 2A:
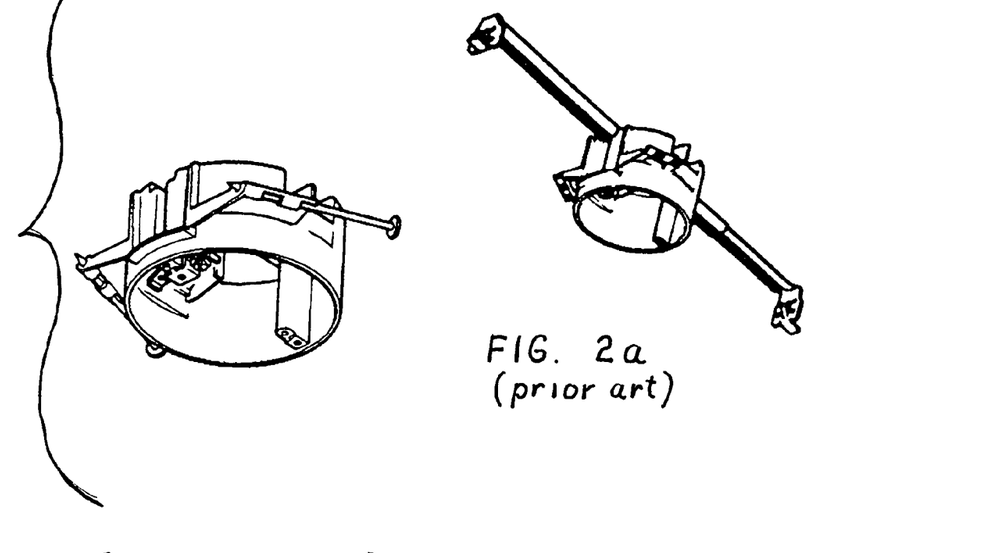
FIGS. 2a and 2b are perspective views of prior art fixture boxes.
Figure 2B:
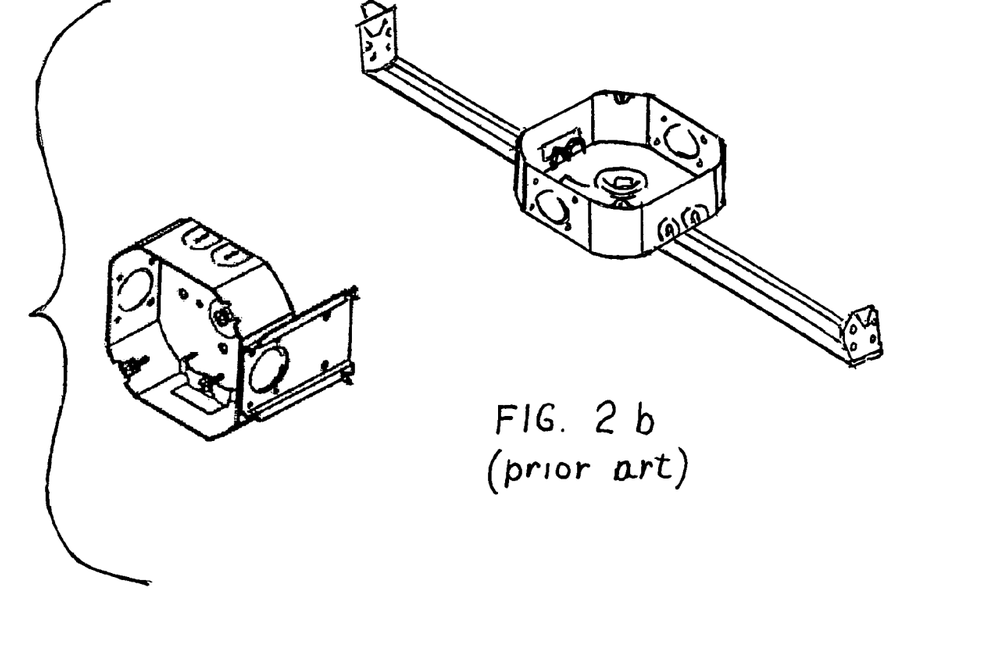

FIGS. 2a and 2b represent different types of prior art fixture boxes and the mounting applications for the same. FIG. 2a illustrates plastic boxes and FIG. 2b illustrates metal boxes.

Figures 3A, 3B, 3C:
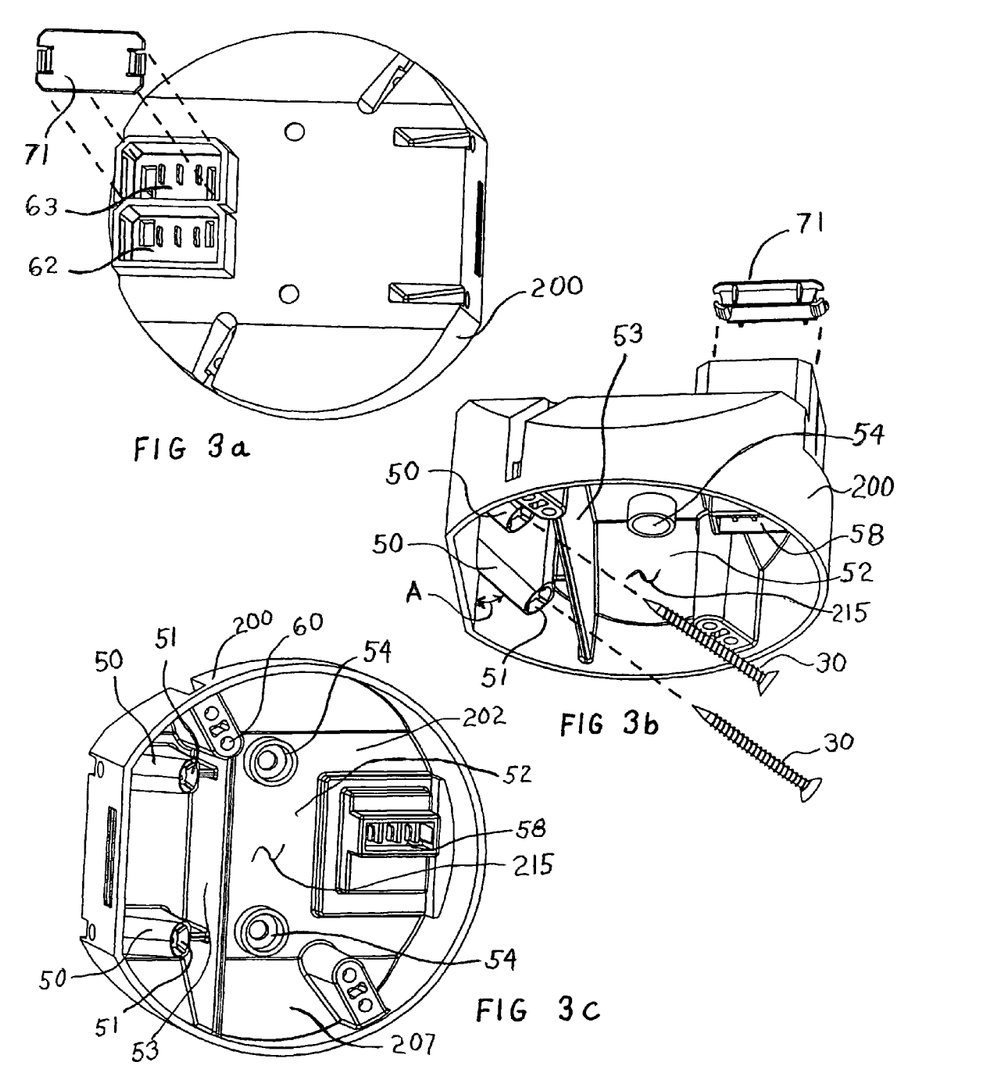
FIGS. 3a, 3b and 3c, respectively, show, a bottom view, a side view and an open top view showing the various ports, port covers, mounting blocks, screw holes, mounting screw holes, mounting screws, a wiring compartment with the separation wall.
Figure 3D:
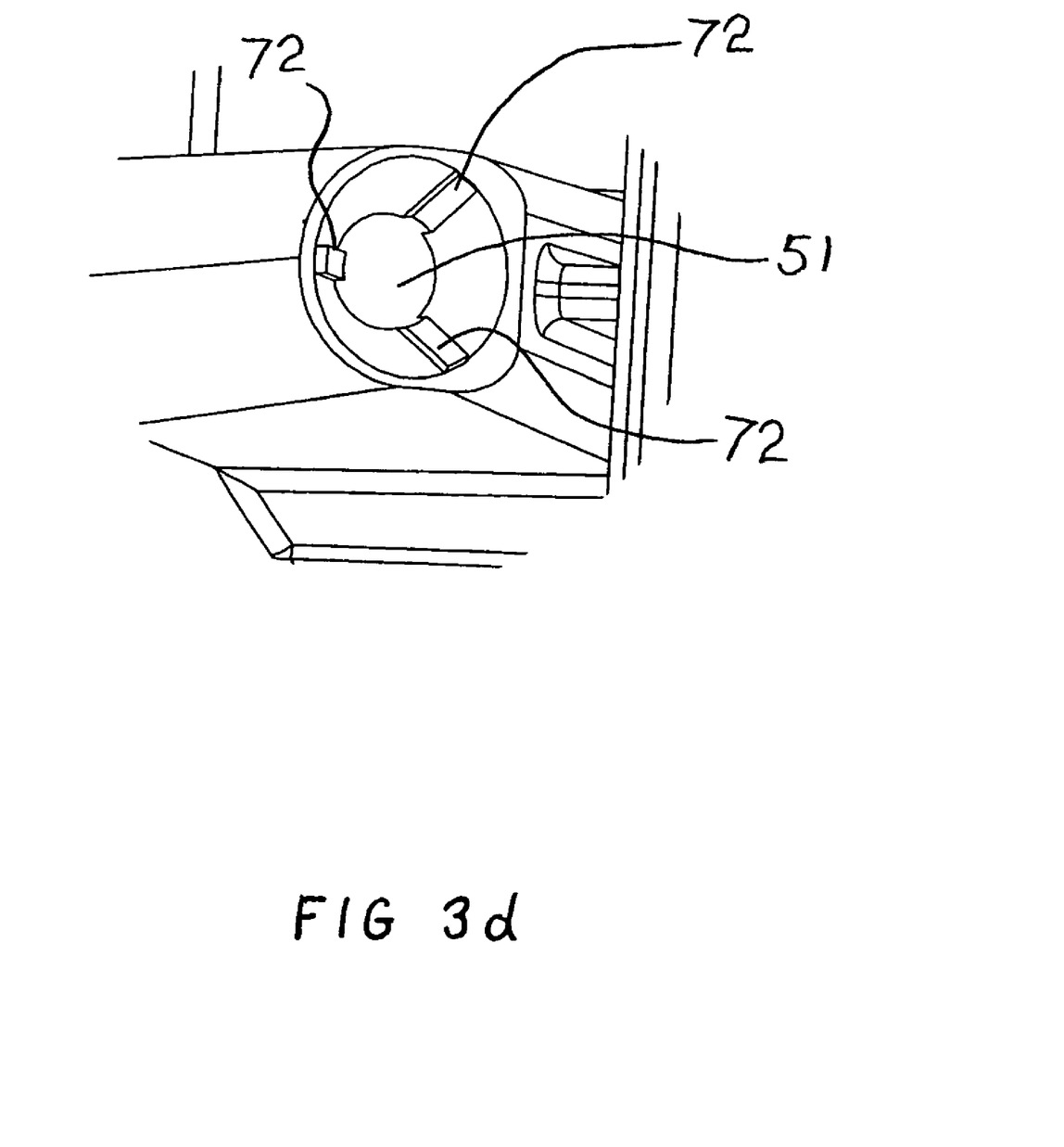
FIG. 3d is an exploded view of the mounting screw holes.

Referring to FIGS. 3a, 3b and 3c, various features of the fixture box 200 of the present invention will be further explained. Mounting blocks 50 are provided at an angle A of approximately 45°. The mounting blocks 50 are provided with mounting holes 51 which are the means by which the box 200 is attached or anchored with screws 30 to a stud 35 (FIG. 7b) located in a wall or ceiling. FIG. 3d is an exploded view detailing a special design in the countersink holes. The compression nodes 72 are engineered to engage the mounting screws when installed into the mounting blocks to secure the fixture to the stud or joist. The compression nodes flatten out as the screw head makes contact, creating resistance and preventing over tightening and damage to the countersink holes. The mounting blocks 50 are designed in the interior 215 of the box 200, so that the box can be mounted after the finished wall or ceiling is instilled. This makes completed construction of the walls and ceiling easier and faster in that drywall, spackling, and painting, can be done before the light fixture box is installed. Also shown in FIGS. 3b and 3c is the wiring compartment 52 which is separated from the mounting blocks 50 with a partition wall 53. Partition wall 53 keeps all the wires attached to the fixture away from the mounting screws 30. Two shrouded holes 54 located in the central portion 207 of the bottom wall 202 are specifically designed for mounting screws 55 (FIG. 4) which will anchor a ceiling bracket clamp 56 to the box to provide a mounting means for a ceiling bar bracket 57. Using the ceiling bracket 56, gives the installer the option of mounting the fixture box 200 between two adjacent ceiling joists.

Figure 4A:
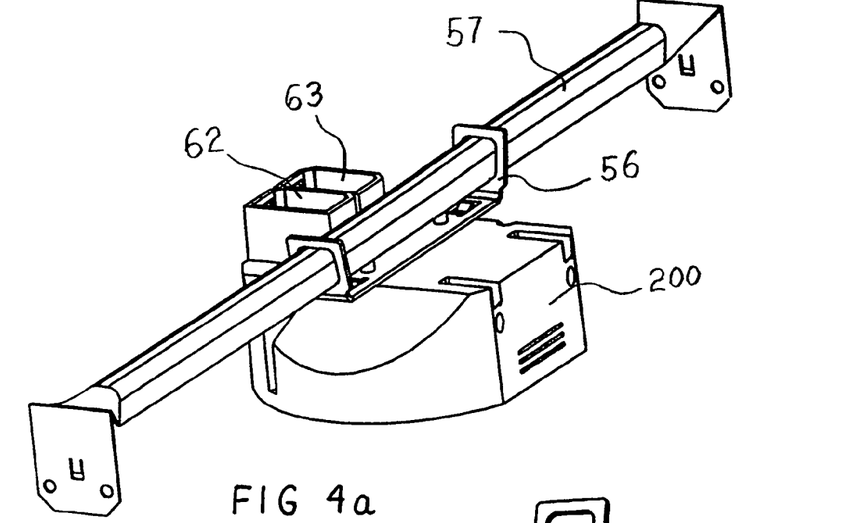
FIGS. 4a and 4b display two views of a fixture box having a fixture box bracket clamp for use with a ceiling bracket.
Figure 4B:
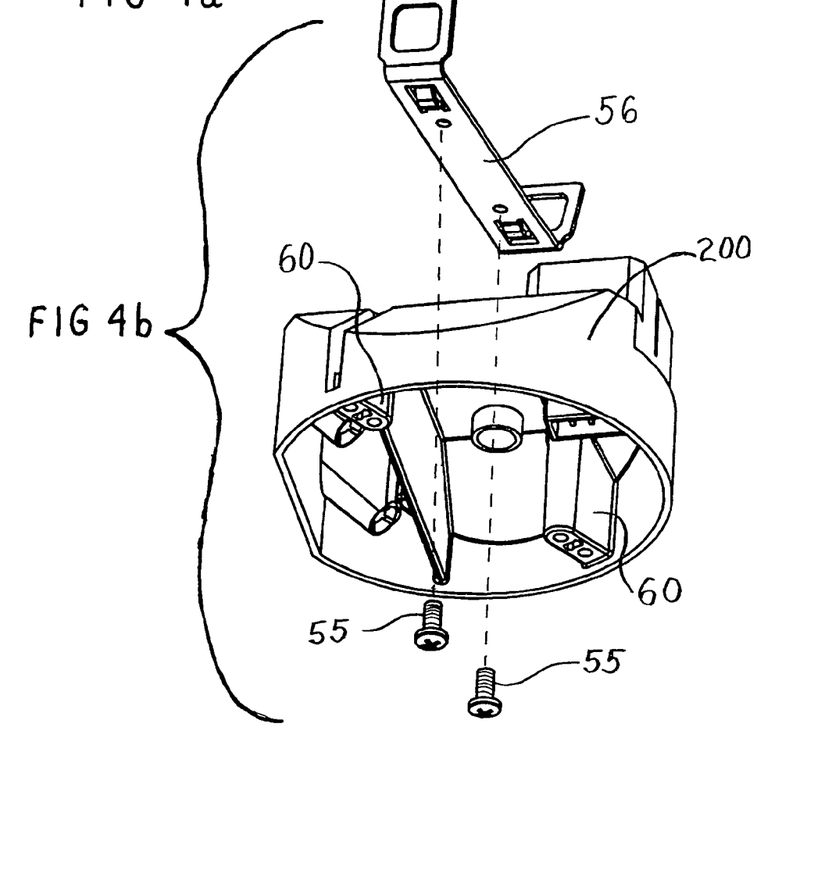
Figures 5A, 5B:
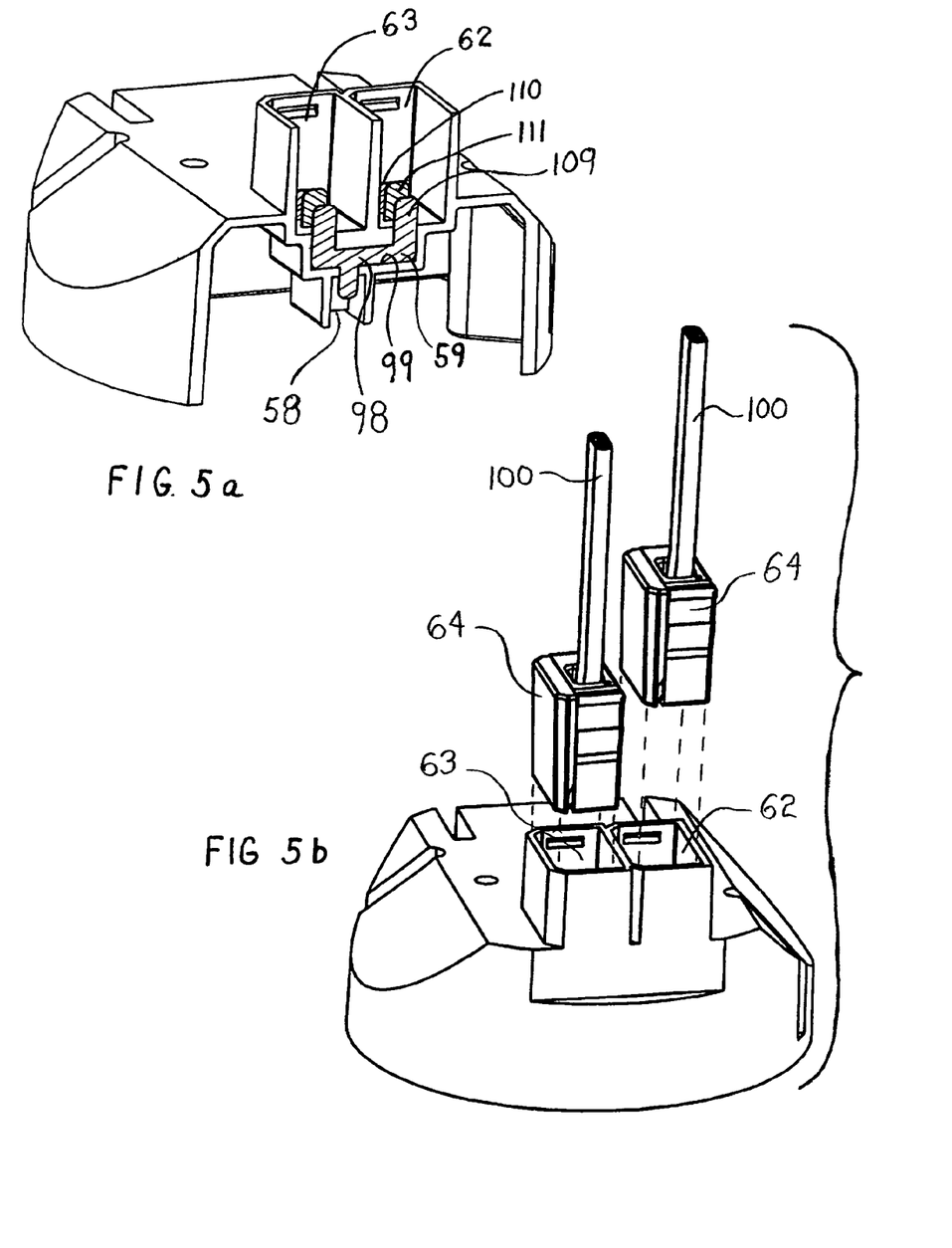
FIGS. 5a and 5b, respectively, are a cross section view showing interior bussing and a side perspective top view showing the NM-B connector.
Figures 7A, 7B:
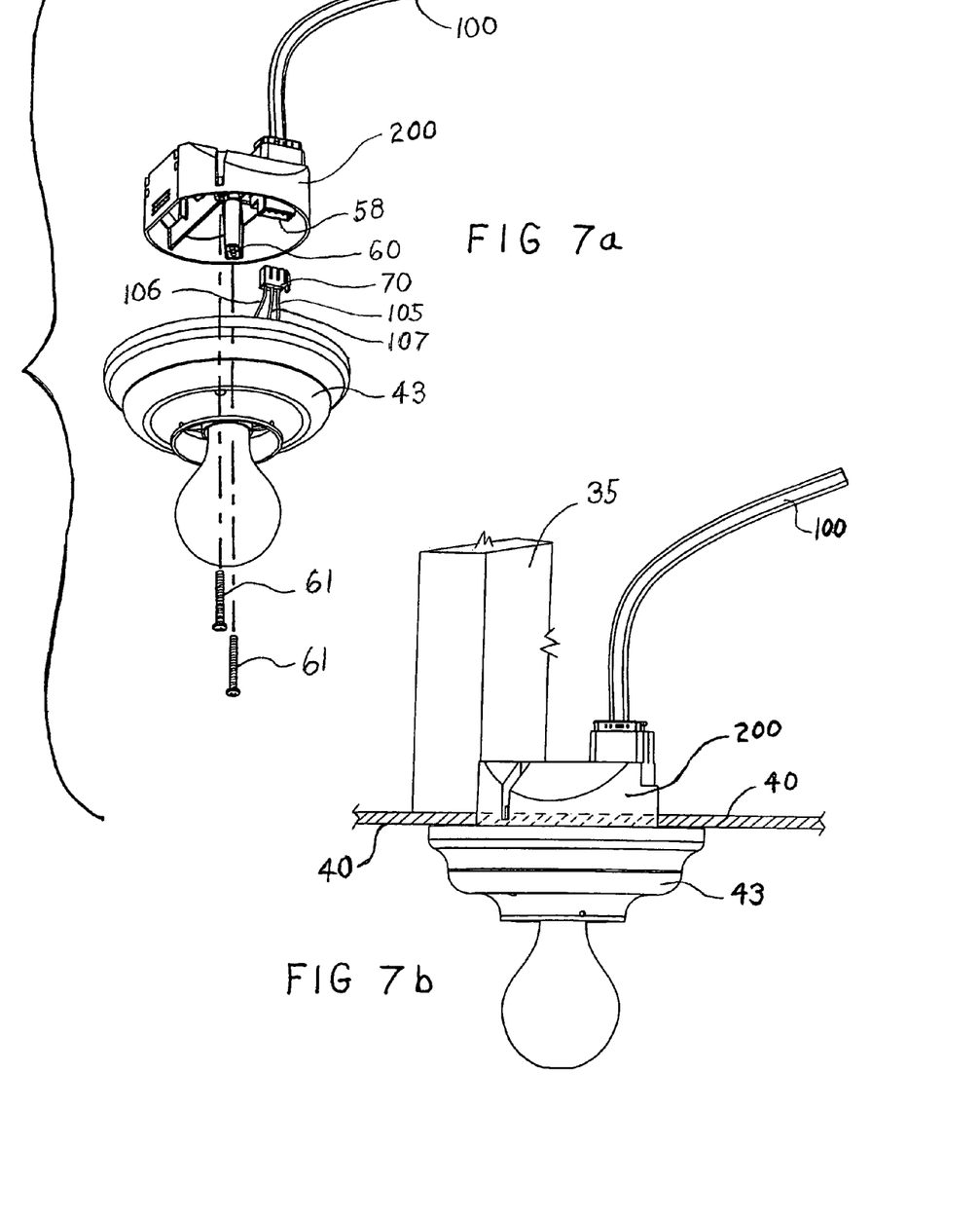
FIGS. 7a and 7b are perspective views showing the fixture wiring of the present invention and the ceiling installation.

A light fixture port or receptacle 58 as shown in FIGS. 3c and 4b, receives a plug 70 (see FIG. 7a) which attached to the light fixture. This connection supplies the electrical current delivered by the power buss 59 (see FIG. 5a) manufactured from a copper alloy and brass, to the light fixture 43. As shown in FIG. 7a, the special connector plug 70 will be attached to a light fixture 43 with three wires, namely, a hot wire 105, a neutral wire 106, and ground wire 107. It is envisioned that such a connector plug 70 would preferably installed by the light manufacturers but such a plug can be attached to existing light fixtures by the installer if such plugs 70 are not so pre-wired into the light fixture 43. In prior art devices, the ground wire 107, as required by code is attached to the metal box with a grounding screw 108, shown in FIG. 6a. The present invention allows all three wires to be attached to the connector including the ground wire. This quick and easy installation is accomplished by grounding through the complete wiring system of the Q-CEB connector to the fixture connector via the internal bussing eliminating the labor involved that's done in conventional wiring. The three sections of buss, namely hot buss 109, neutral buss 110, and ground buss 111, are shown in FIG. 5a and each have a generally lower case letter "h" configuration with one leg extending into port 62, another leg extending into port 63 and an arm extending into port 58. Each buss portion has a central portion 98 between the arms and legs thereof which are in a fully enclosed buss chamber 99 located in said fixture box 200. The bussing is factory installed and enclosed thereby providing for safety as well as ease of installation. Standard fixture mounting holes 60 (see FIGS. 3c, 4b, and 7a) are provided to accept fixture mounting screws 61 that enable the fixture 43 to be anchored to the fixture box 200. As best shown in FIGS. 7a and 7b, the fixture 43 completely encloses the open end (opposite the bottom wall 202) of the generally cylindrical side wall 210 of the fixture 200 thus making all of the wiring fully enclosed.

FIGS. 3a, 5a and 5b) show the input port 62 and the output port 63 located on the bottom wall 202 exterior 204 of the box 200. The input and output ports accept the Q-CEB connector 64 as described in Libby U.S. Pat. Nos. 7,144,269 and 7,281,941. These connectors make it possible to terminate the NM-B 100 used to deliver the electrical current to the fixture box and the light fixture without having to strip the outer sheath and removing the insulation on the individual conductors. The input port 62 allows the current to flow into the box 200 taking the current through the bussing 109, 110, and 111 to the output port 63 on the bottom wall 202 exterior 204 of the box 200 to allow for powering a second light fixture. The bussing also carries the current to the light fixture port 58 (see FIGS. 3c, 5a and 7a) to supply electrical current to the light fixture 43. Fixture port 58 is located on the interior surface 206 of the bottom wall 202 of the fixture box 200.

For added safety, knockout covers 71 (see FIGS. 3a and 3b) are also provided so that the covers 71 will completely seal the ports and prevent access to the bussing when a Q-CEB connector port is not used. These covers can only be removed with a flat head screw driver.

The fixture box of the present invention is engineered for use with the Q-CEB insulation displacement connector (IDC). The fixture box has an input and two output ports which are electrically connected with metal bussing and is designed to simplify the process of installing light fixtures. The present invention provides greater safety to the end user or homeowner than existing fixture boxes because the bussing of the fixture box of the present invention is completely enclosed. The invention also lowers labor costs due to the quick termination of the Q-CEB to the snap in connection at the ports. The fixture box of the present invention can be mounted and wired after the finished ceiling is installed making it a labor saving device for all of the installers, including the finishers and the painters.

The invention claimed is:

1. A fixture box for a light fixture comprising:
   (a) a housing having an interior and an exterior;
   (b) an input port accessible from the exterior of said housing to receive and terminate an incoming electrical power source cable;
   (c) an output port accessible from the exterior of said housing to provide a means of providing electrical power to another fixture;
   (d) a light fixture port accessible from the interior of said housing providing an electrical connection between the incoming power and the light fixture; and
   (e) a fully enclosed buss chamber located in said fixture box, said buss chamber having a hot metal bussing portion to connect a hot side of an electrical power source applied to the input port to the output port and to the fixture port,
   (f) a neutral metal bussing portion to connect a neutral side of the electrical power source applied to the input port to the output port and to the fixture port, and a ground metal bussing portion to connect a ground of the electrical power source applied to the input port to the output port and to the fixture port, each of said bussing portions having a central portion between an arm and a leg portions thereof.

2. A fixture box according to claim 1, wherein said housing has a base member having an interior surface and an exterior surface, said exterior surface forming a bottom side of the fixture box with said input port being located in a first position on said bottom side of said fixture box whereby said input port will accept a quick connect electrical connector and said input port is a termination point of the two conductor with ground, non-metallic cable which carries electric current from the electrical power source to the light fixture through said bushings.

3. A fixture box according to claim 2, wherein said output port is located in a second position on the bottom side of the fixture box and will accept a quick connect electrical connector to provide a connection to an auxiliary cable running to the another light fixture, said output port being connected to said input port by said hot, neutral and ground bussing portions.

4. A fixture box according to claim 2, wherein said light fixture port is located on the interior surface of said base member located inside fixture box and is designed to accept a molded plug installed on a light fixture to provide a plug type connection whereby eliminating a manual stripping of insulated wires and the use of twist-on wire connectors to make electrical connections, said light fixture port being provided with electrical power from said input port by said hot, neutral, and ground busing portions.

5. A fixture box according to claim 1, further comprising mounting blocks with mounting holes located inside the fixture box providing options of mounting the fixture box before or after finished wall is installed.

6. A fixture box according to claim 5, wherein said mounting blocks are mounted at an angle "A" which is approximately 45 degrees.

7. A fixture box according to claim 5, wherein mounting blocks contain countersink holes which include compression nodes to protect the countersink holes.

8. A fixture box according to claim 5, wherein said mounting blocks are separated by a partition wall to keep a wire compartment separate and insulated from mounting screws.

9. A fixture box according to claim 1, wherein a bottom side of the fixture box is designed with two optional mounting holes for attaching a ceiling bracket clamp so the fixture box can be mounted between two joists with said ceiling bracket.

10. A fixture box according to claim 1, wherein each said buss portion has a generally lower case letter "h" configuration.

11. A fixture box according to claim 1, wherein each said buss portion has one leg extending into said input port, another leg extending into said output port and an arm extending into said fixture port.

* * * * *